United States Patent
Bond, III et al.

(10) Patent No.: US 6,517,172 B1
(45) Date of Patent: Feb. 11, 2003

(54) DRIVER AUGMENTED AUTONOMOUS BRAKING SYSTEM

(75) Inventors: John Vincent Bond, III, Inkster, MI (US); Gerald H Engelman, Plymouth, MI (US); Jonas Ekmark, Gothenburg (SE); Jonas L. Z. Jansson, Gothenburg (SE); M. Nabeel Tarabishy, Walled Lake, MI (US); Levasseur Tellis, Southfield, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,013

(22) Filed: Nov. 8, 2001

(51) Int. Cl.[7] ................................................. B60T 8/32
(52) U.S. Cl. ...................................................... 303/193
(58) Field of Search ............................ 303/9, 125, 167, 303/193; 180/268, 271, 282; 280/734, 735

(56) References Cited

U.S. PATENT DOCUMENTS

| | | | |
|---|---|---|---|
| 3,448,822 A | * 6/1969 | La Lone et al. ............ 180/169 |
| 4,073,359 A | 2/1978 | Fujiki et al. |
| 4,146,108 A | 3/1979 | Sato |
| 5,173,859 A | * 12/1992 | Deering ....................... 701/70 |
| 5,332,057 A | * 7/1994 | Butsuen et al. ............. 180/169 |
| 5,420,792 A | 5/1995 | Butsuen et al. |
| 5,467,284 A | 11/1995 | Yoshioka et al. |
| 5,485,892 A | 1/1996 | Fujita |
| 5,635,922 A | 6/1997 | Cho et al. |
| 5,697,469 A | * 12/1997 | Klarer et al. ............... 180/268 |
| 5,699,040 A | 12/1997 | Matsuda |
| 5,924,508 A | 7/1999 | Clauss et al. |
| 5,941,608 A | 8/1999 | Campau et al. |
| 5,952,939 A | 9/1999 | Nakazawa et al. |
| 6,017,102 A | * 1/2000 | Aga ........................... 303/191 |
| 6,058,347 A | * 5/2000 | Yamamura et al. ........... 701/96 |
| 6,070,682 A | 6/2000 | Isogai et al. |
| 6,084,508 A | 7/2000 | Mai et al. |
| 6,105,705 A | 8/2000 | Faye |
| 6,131,063 A | 10/2000 | Seki et al. |
| 6,189,987 B1 | 2/2001 | Shimizu |
| 6,226,593 B1 | 5/2001 | Kurz et al. |
| 6,260,880 B1 | * 7/2001 | Hada et al. ................. 280/735 |

* cited by examiner

Primary Examiner—Christopher P. Schwartz
Assistant Examiner—Xuan Lan Nguyen
(74) Attorney, Agent, or Firm—Frank A. MacKenzie

(57) ABSTRACT

An enhanced autonomous emergency braking system includes an accelerator pedal operated by the driver and used to control the overall vehicle speed. When a forward detection apparatus detects an imminent contact, the braking system automatically applies braking force to the vehicle while the vehicle engine speed is reduced. The amount of brake force applied is a continuous function of relative speed, relative distance, collision probability and target classification. The braking force may be reduced when the driver or passenger are unbuckled or may be disabled if the driver depresses the accelerator pedal by a predetermined amount. In addition, the amount of brake force applied by the driver is amplified to further enhance braking performance.

20 Claims, 4 Drawing Sheets

DRIVER AUGMENTED AUTONOMOUS BRAKING SYSTEM

BACKGROUND OF INVENTION

The present invention relates generally to brake systems for automotive vehicles, and more particularly, to an enhanced autonomous emergency braking system.

Automotive brake systems are the result of a long evolutionary process and are one of the most important systems in a vehicle. Typical brake systems include a master cylinder, located under the hood, which is directly connected to a brake pedal. The master cylinder converts mechanical pressure applied to the brake pedal into a proportional amount of hydraulic pressure. This hydraulic pressure is used to actuate the vehicle brakes. Many brake systems also use the engine's energy to add pressure to the master cylinder.

To improve upon standard braking systems, various automatic braking systems have been suggested in the prior art. U.S. Pat. No. 5,699,040 discloses a vehicle collision preventing system. The '040 patent uses a distance measuring unit to determine how close a host vehicle is to an object in front of it. Once the distance between the host vehicle and the subject vehicle becomes too small, an automatic braking signal is generated by a judging means.

U.S. Pat. No. 6,084,508 discloses an automatic emergency braking method and arrangement. Through the use of a radar or laser sensor, the '508 patent monitors the surroundings, including changes in the remote vehicle's actions. Based on changes in the surroundings automatic braking is done with maximum braking pressure.

Unfortunately, the systems suggested by these patents have several disadvantages. In many situations, application of maximum braking pressure may have a detrimental effect. Likewise, application of brake force without consideration of the presence or belted status of occupants is not desirable. Additionally, the driver should have the ability to override any automatic braking feature in the case of a system fault. Finally, reducing engine speed before automatic application of brakes may improve overall system performance.

The disadvantages associated with these conventional automatic emergency braking techniques have made it apparent that a new technique for automatic emergency braking is needed. The new technique should reduce overall vehicle kinetic energy while enhancing driver performance. The present invention is directed to these ends.

SUMMARY OF INVENTION

It is, therefore, an object of the invention to provide an improved and reliable enhanced autonomous emergency braking system.

In accordance with the objects of this invention, an enhanced autonomous emergency braking system is provided. The enhanced autonomous emergency braking system includes an accelerator pedal operated by the driver and used to control the overall vehicle speed. When a forward detection apparatus detects an imminent contact, the braking system automatically applies braking force to the vehicle while the vehicle engine speed is reduced. The amount of brake force applied is a continuous function of relative speed, relative distance, collision probability and target classification. The braking force may be reduced when the driver or passenger are unbuckled or may be disabled if the driver depresses the accelerator pedal by a predetermined amount. In addition, the amount of brake force applied by the driver is amplified to further enhance braking performance.

The present invention thus achieves an improved emergency brake assist system. The present invention is advantageous in that it enhances driver braking performance during imminent contact situations. Additionally, the present invention may maintain standard braking levels when an occupant is unbelted.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

Figure 1:
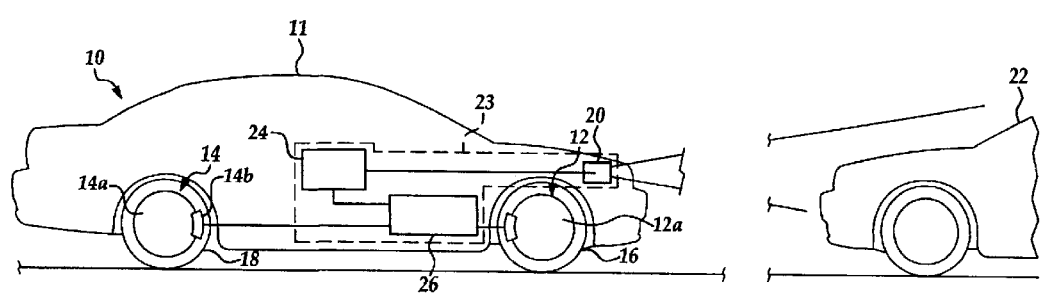
FIG. 1 illustrates an enhanced autonomous emergency braking system in accordance with one embodiment of the present invention.

In the following figures, the same reference numerals will be used to identify identical components in the various views. The present invention is illustrated with respect to an enhanced autonomous emergency braking system, particularly suited for the automotive field. However, the present invention is applicable to various other uses that may require an enhanced autonomous emergency braking system.

Referring to FIG. 1, an emergency brake assist system 10 according to one embodiment of the present invention will be described. A vehicle 11 is provided with a brake system 26 having brake mechanisms 12 and 14 for front and rear wheels 16 and 18, respectively. In one aspect of the invention, brake mechanisms 12 and 14 comprise disc rotors 12a and 14a rotating with wheels 16 and 18, calipers 12b and 14b for braking the rotation of disc rotors 12a and 14a when hydraulic fluid for braking control is supplied. Further, vehicle 11 comprises a forward detection apparatus 20 for detecting the distance and relative speed between the driving vehicle 11 and the leading vehicle 22 by irradiating laser beams, infrared, radar, microwave or equivalent detection means. Vehicle 11 also includes an enhanced autonomous emergency braking apparatus 23 having a controller 24 receiving signals from the forward detection apparatus 20.

The intention of the present invention is to mitigate or avoid imminent frontal contact by means of automatic brake application. Application of the present invention should only occur when the opportunity to steer away from the threat is passed. Preliminary efficiency estimations show that contact with low relative speed can be avoided; at higher relative speed, the contact speed may be significantly reduced.

Figure 2:
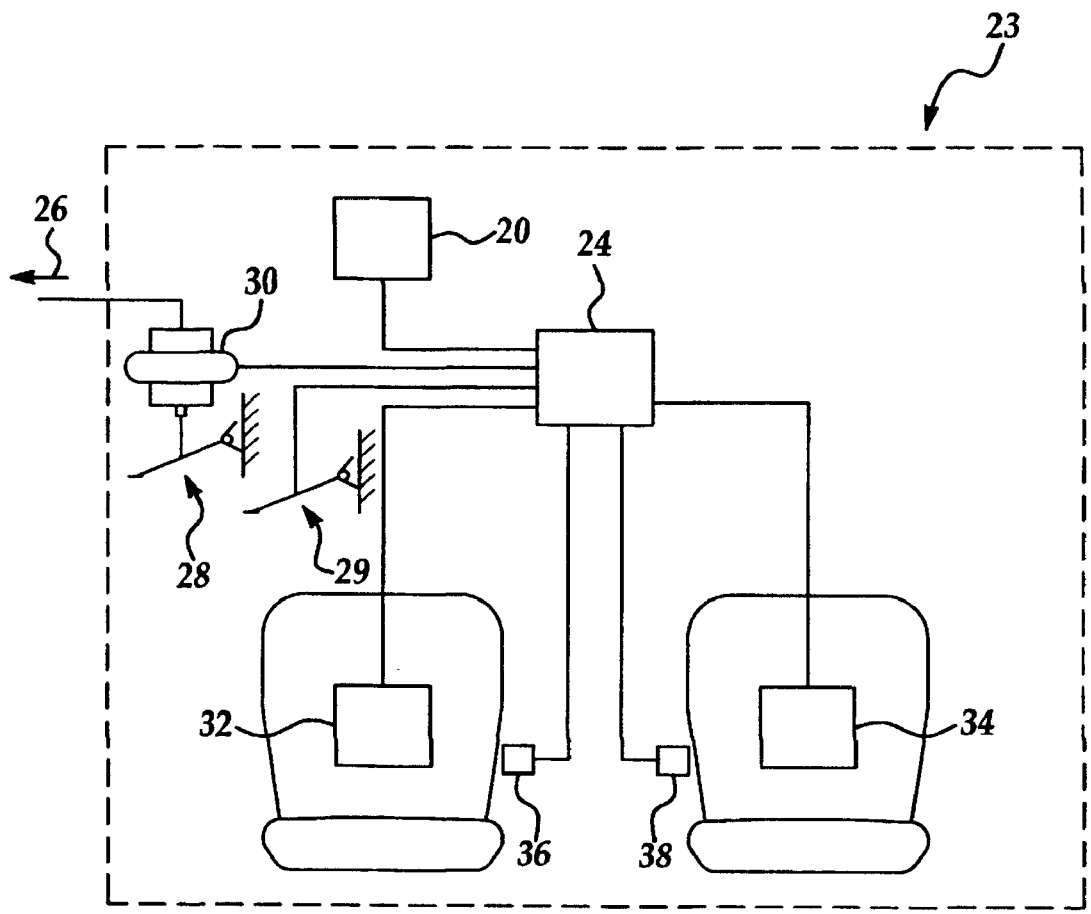
FIG. 2 is an enhanced autonomous emergency braking apparatus in accordance with one embodiment of the present invention.

Referring to FIG. 2, an enhanced autonomous emergency braking apparatus 23 according to one embodiment of the present invention will be described. A brake pedal 28 operated by the driver (not shown) exerts a brake pedal force upon a variable brake booster 30. The braking system 26 is coupled to the variable brake booster 30 that produces a variable brake booster force causing the braking system 26 to exert a braking force proportional to the pedal force. An accelerator pedal 29 controls engine speed and is coupled to an accelerator position sensor. When the forward detection apparatus 20 detects an imminent contact, it notifies the driver of an imminent contact and signals controller 24.

Controller 24 automatically applies brake force upon imminent collision indication. The amount of brake force applied is continuously controllable. In a continuously variable system, the amount of brake force applied is proportional to the distance and the relative speed between vehicle 11 and vehicle 22. In many situations, it is beneficial to ramp up brake force instead of applying full brake force at once. Likewise, brake release should also be controllable in order to avoid unnecessary jerk. In the preferred embodiment, the amount of brake force applied is a continuous function of relative speed, relative distance, collision probability and target classification. Additionally, controller 24 may reduce engine speed upon imminent collision indication.

Autonomous brake force will be released when threat indication is reset or when the accelerator pedal is depressed by a predetermined amount. In the preferred embodiment of the present invention, the predetermined amount is full throttle, but one skilled in the art would realize that other throttle positions might be adequate. When the throttle is depressed to a predetermined position during an automatic braking event, the driver has chosen to accelerate despite the emergency. Therefore, the autonomous braking system may be inoperative. When this occurs, the autonomous braking system is disabled until vehicle 11 is serviced.

When the present invention applies less than maximum braking force the system may also be used to amplify driver applied brake pedal force. In this situation, upon imminent collision indication, controller 24 increases the variable brake booster force such that the braking system 26 exerts an amplified braking force proportional to the brake pedal force. In either case, the enhanced autonomous emergency braking apparatus applies a braking force upon imminent contact indication that may be supplemented by force applied by the driver.

In an alternative embodiment of the present invention, apparatus 23 includes a driver present switch 32, a passenger present switch 34, a driver seatbelt switch 36, and a passenger seatbelt switch 38. If the driver seatbelt switch 36 indicates that the driver is unbuckled, then apparatus 23 will apply a reduced automatic braking force. Likewise, if the passenger present switch 34 and the passenger seatbelt switch 38 indicate that a passenger is present and unbuckled, then apparatus 23 will apply a reduced automatic braking force. In either case, the system may reduce braking force to the point that the system operates in a normal mode.

The present invention requires a brake booster that has the ability to vary the gain of the brake pedal characteristic. Typically, this is only possible with electro-hydraulic or electro-mechanical brake systems. A conventional brake system with an electronically controlled active booster (i.e. Teves Mk25) does not offer similar functionality. In the latter case, the ability for the driver to control the deceleration continuously during active booster activation is lost. The reason is that pedal pressure cannot be measured accurately during booster activation. The automatic braking action must consequently be enabled/disabled by a so-called "release switch". This concept also implies that full braking power has to be applied during activation, because once the active booster is activated, the brake pedal pressure cannot be measured accurately any longer.

Figure 3:
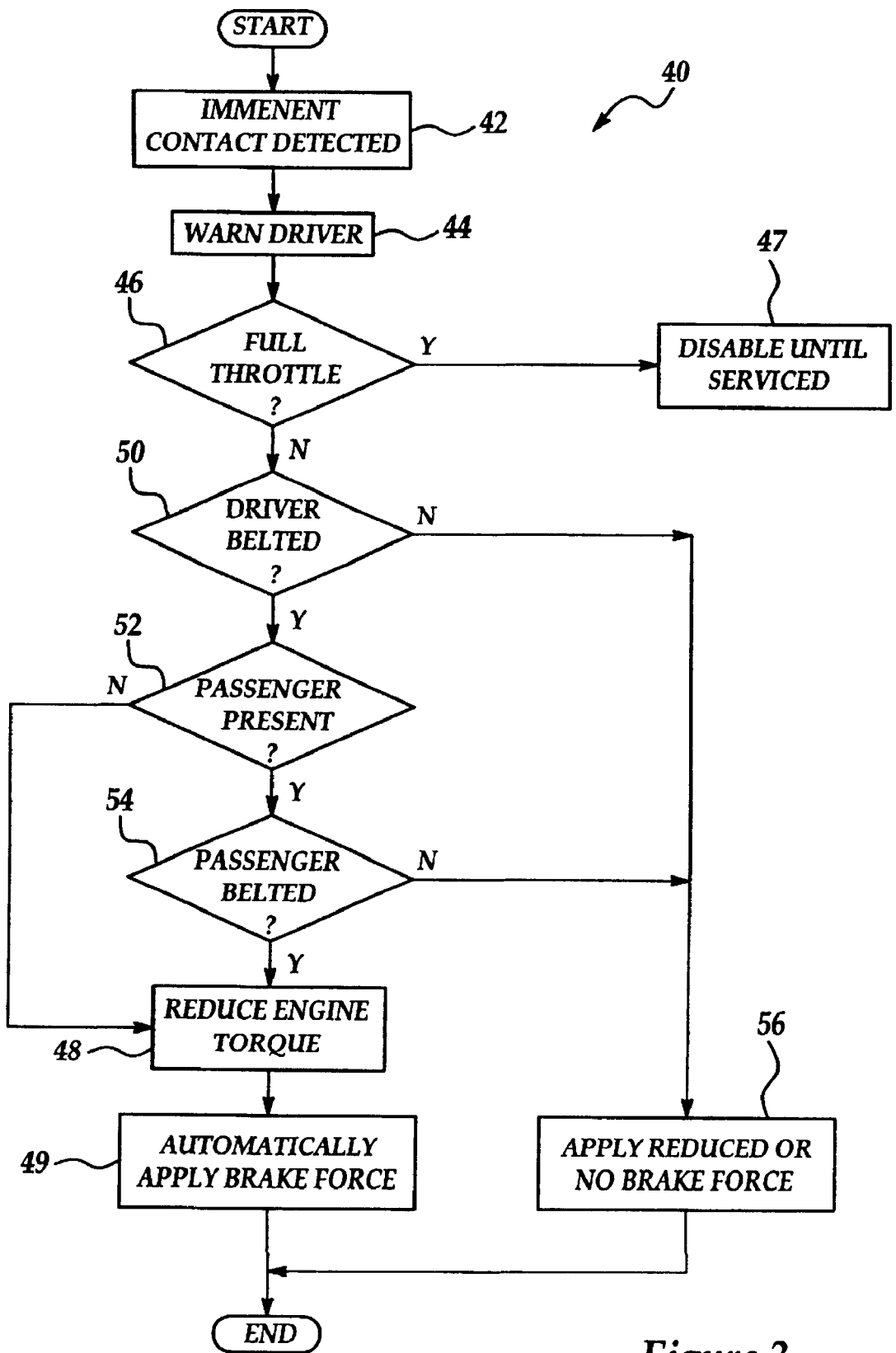
FIG. 3 depicts a flow chart of an method for providing enhanced autonomous emergency braking in accordance with one embodiment of the present invention.

Referring to FIG. 3, a method for providing enhanced autonomous emergency braking 40 in accordance with one embodiment of the present invention is illustrated. Method 40 begins with step 42 by detecting an imminent contact. Upon detection of an imminent contact the sequence proceeds to step 44 by notifying the driver of the imminent contact. This warning may include an audible signal or a visual signal, such as a telltale or head-up display. The sequence then proceeds to step 46 where the position for accelerator pedal 29 is monitored. If accelerator pedal 29 is fully depressed, then the method proceeds to step 47 where the system is disabled until the vehicle is serviced. If accelerator pedal 29 is not fully depressed, then the sequence proceeds to step 48. In step 48, the engine speed is reduced. The sequence then proceeds to step 49 where braking system 26 exerts a predetermined braking force to vehicle 11. The amount of brake force applied is a continuous function of relative speed, relative distance, collision probability and target classification. A brake pedal force applied by the driver may supplement this braking force.

In an alternative embodiment of the present invention, method 40 also includes additional steps 50, 52, and 54 between steps 46 and 48. In step 50, the driver seatbelt status is determined. If the driver seatbelt is buckled, then the sequence proceeds to step 48 where engine speed is reduced. If the driver seatbelt is not buckled, then the sequence proceeds to step 56 where the automatic braking force is reduced or disabled. In step 52, the presence of a passenger is determined. If a passenger is not present, then the sequence proceeds to step 48 where engine speed is reduced. If a passenger is present, then the sequence proceeds to step 54. In step 54, the passenger seatbelt status is determined. If the passenger seatbelt is buckled, then the sequence proceeds to step 48 where engine speed is reduced. If the passenger seatbelt is not buckled, then the sequence proceeds to step 56 where the automatic braking force is reduced or disabled.

Figure 4:
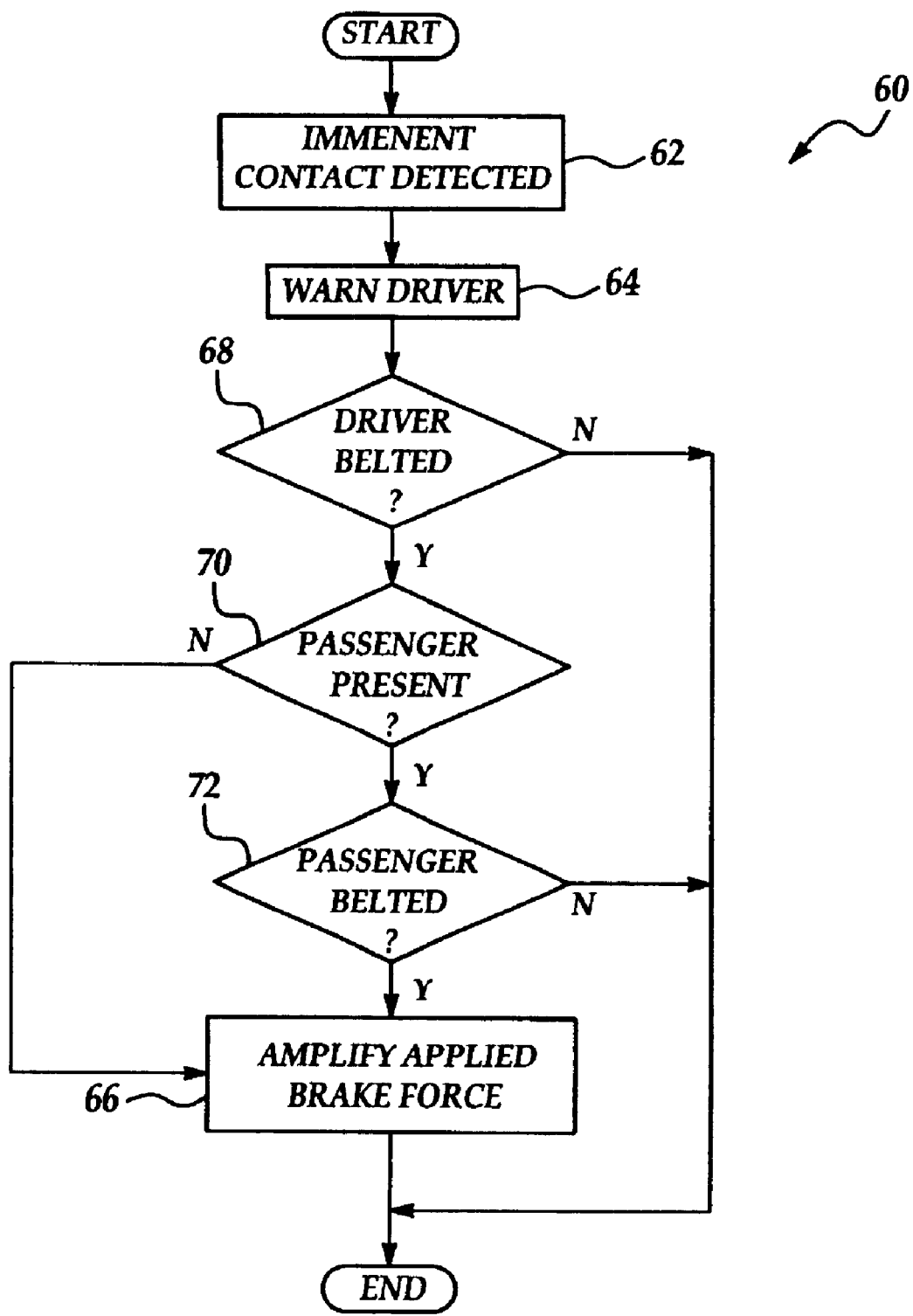
FIG. 4 depicts a flow chart of an alternative method for providing emergency brake assistance in accordance with one embodiment of the present invention.

Referring to FIG. 4, a flow chart of an alternative method 60 for providing enhanced autonomous emergency braking in accordance with one embodiment of the present invention is illustrated. If vehicle 11 is operated with cruise control active, or if a collision imminent state is entered with throttle position released, i.e., coasting, method 60 may be enabled, as method 40 does not apply to those cases. Method 60 begins with step 62 by detecting an imminent contact. Upon detection of an imminent contact the sequence proceeds to step 64 by notifying the driver of the imminent contact. This warning may include an audible signal or a visual signal, such as a telltale or head-up display. The sequence then proceeds to step 66 by increasing the variable brake booster force by a predetermined factor proportional to force applied to the brake pedal by the driver. The braking system 26 will then exert an amplified braking force proportional to the pedal force.

In an alternative embodiment of the present invention, method 60 also includes additional steps 68, 70, and 72 between steps 64 and 66. In step 68, the driver seatbelt status is determined. If the driver seatbelt is buckled, then the sequence proceeds to step 66 where amplified braking force is enabled. If the driver seatbelt is not buckled, then the sequence ends and amplified braking force is reduced. In step 70, the presence of a passenger is determined. If a passenger is not present, then the sequence proceeds to step 66 where amplified braking force is enabled. If a passenger is present, then the sequence proceeds to step 72. In step 72, the passenger seatbelt status is determined. If the passenger seatbelt is buckled, then the sequence proceeds to step 66 where amplified braking force is enabled. If the passenger seatbelt is not buckled, then the sequence ends and amplified braking force is reduced.

The method and system of the present invention reduces kinetic energy in frontal contacts by enhancing driver performance during imminent contact situations. Additionally, the present invention may maintain standard braking levels when an occupant is unbelted.

From the foregoing, it can be seen that there has been brought to the art a new and improved enhanced autonomous emergency braking system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. An enhanced autonomous emergency braking apparatus comprising:
    a braking system coupled to a variable brake booster, said variable brake booster being operative to produce a variable brake booster force;
    a brake pedal coupled to said variable brake booster, said brake pedal exerting a brake pedal force upon said variable brake booster, wherein said braking system exerts a braking force proportional to said brake pedal force during normal operation;
    an accelerator pedal operative to control engine speed and coupled to an accelerator position sensor, said accelerator position sensor being operative to generate an accelerator position signal;
    a forward detection apparatus operative to detect vehicle distance, vehicle speed, and imminent contact and generate an imminent contact signal, a vehicle distance signal, and a vehicle speed signal; and
    a controller coupled to said variable brake booster and being operative to receive said accelerator position signal, said imminent contact signal, said vehicle distance signal, and said vehicle speed signal, said controller including control logic operative to automatically apply a predetermined amount of variable brake booster force proportional to said vehicle distance signal and said vehicle speed signals in response to said imminent contact signal and also amplify said variable brake booster force, wherein said braking system exerts an additional braking force proportional to said brake pedal force.

2. The enhanced autonomous emergency braking apparatus as recited in claim 1, wherein said controller contains control logic operative to disable said automatic variable brake booster force when said accelerator pedal is in a predetermined depressed position.

3. The enhanced autonomous emergency braking apparatus as recited in claim 1, wherein said controller includes control logic operative to reduce said engine speed in response to said imminent contact signal.

4. The enhanced autonomous emergency braking apparatus as recited in claim 1, wherein said forward detection apparatus includes a forward contact warning apparatus, said forward contact warning apparatus operative to notify a driver of said imminent contact.

5. The enhanced autonomous emergency braking apparatus as recited in claim 1, further comprising a driver seatbelt switch operative to generate a driver unbuckled signal when a driver seatbelt is unbuckled, said driver seatbelt switch being coupled to said controller.

6. The enhanced autonomous emergency braking apparatus as recited in claim 5, wherein said controller includes control logic operative to reduce said automatic braking force when said driver seatbelt is unbuckled.

7. The enhanced autonomous emergency braking apparatus as recited in claim 1, further comprising a passenger present switch operative to generate a passenger present signal when a passenger is present in a passenger seat, said passenger present switch being coupled to said controller.

8. The enhanced autonomous emergency braking apparatus as recited in claim 7, further comprising a passenger seatbelt switch operative to generate a passenger unbuckled signal when a passenger seatbelt is unbuckled, said passenger seatbelt switch being coupled to said controller.

9. The enhanced autonomous emergency braking apparatus as recited in claim 8, wherein said controller includes control logic operative to reduce said automatic braking force when said passenger is present and said passenger seatbelt is unbuckled.

10. An enhanced autonomous emergency braking system for a vehicle comprising:
    a braking system located in the vehicle and coupled to a variable brake booster,
    said variable brake booster being operative to produce a variable brake booster force;
    a brake pedal located in the vehicle and coupled to said variable brake booster,
    said brake pedal exerting a brake pedal force upon said variable brake booster wherein said braking system exerts a braking force proportional to said brake pedal force during normal operation;
    an accelerator pedal located in the vehicle and operative to control engine speed, said accelerator pedal coupled to an accelerator position sensor, said accelerator position sensor being operative to generate an accelerator position signal;
    a forward detection apparatus located in the vehicle and operative to detect vehicle distance, vehicle speed, and imminent contact and generate an imminent contact signal, a vehicle distance signal, and a vehicle speed signal, said forward detection apparatus operative to notify a driver of said imminent contact; and
    a controller located in the vehicle and coupled to said variable brake booster, said controller being operative to receive said accelerator position signal, said imminent contact signal, said vehicle distance signal, and said vehicle speed signal, said controller including control logic operative to automatically apply a predetermined amount of variable brake booster force proportional to said vehicle distance signal and said vehicle speed signals in response to said imminent contact signal and also amplify said variable brake booster force, wherein said braking system exerts an additional braking force proportional to said brake pedal force.

11. The enhanced autonomous emergency braking system as recited in claim 10, wherein said controller contains control logic operative to disable said automatic variable brake booster force when said accelerator pedal is in a predetermined depressed position.

12. The enhanced autonomous emergency braking system as recited in claim 10, further comprising a driver seatbelt switch operative to generate a driver unbuckled signal when a driver seatbelt is unbuckled, said driver seatbelt switch being coupled to said controller.

13. The enhanced autonomous emergency braking system as recited in claim 12, wherein said controller includes control logic operative to reduce said automatic braking force when said driver seatbelt is unbuckled.

14. The enhanced autonomous emergency braking system as recited in claim 10, further comprising a passenger present switch operative to generate a passenger present signal when a passenger is present in a passenger seat, said passenger present switch being coupled to said controller.

15. The enhanced autonomous emergency braking system as recited in claim 14, further comprising a passenger seatbelt switch operative to generate a passenger unbuckled signal when a passenger seatbelt is unbuckled, said passenger seatbelt switch being coupled to said controller.

16. The enhanced autonomous emergency braking system as recited in claim 15, wherein said controller includes control logic operative to reduce said automatic braking force when said passenger is present and said passenger seatbelt is unbuckled.

17. A method for providing enhanced autonomous emergency braking for a vehicle having a braking system comprising the steps of:

monitoring a position of an accelerator pedal;

monitoring a brake pedal force upon a variable brake booster;

detecting an imminent contact;

generating a variable brake booster force, wherein said braking system exerts a braking force proportional to said brake pedal force during normal operation;

determining distance and relative speed to a second vehicle;

applying a predetermined amount of variable brake booster force proportional to said distance and relative speed to said second vehicle; and increasing said variable brake booster force, wherein said braking system exerts an amplified braking force proportional to said brake pedal force.

18. A method for providing enhanced autonomous emergency braking as recited in claim 17 further comprising the step of reducing said engine speed in response to said imminent contact signal.

19. A method for providing enhanced autonomous emergency braking as recited in claim 17 further comprising the step of reducing said automatic braking force when a driver seatbelt is unbuckled.

20. A method for providing enhanced autonomous emergency braking as recited in claim 17 further comprising the step of reducing said automatic braking force when a passenger is present and a passenger seatbelt is unbuckled.

* * * * *